UNITED STATES PATENT OFFICE.

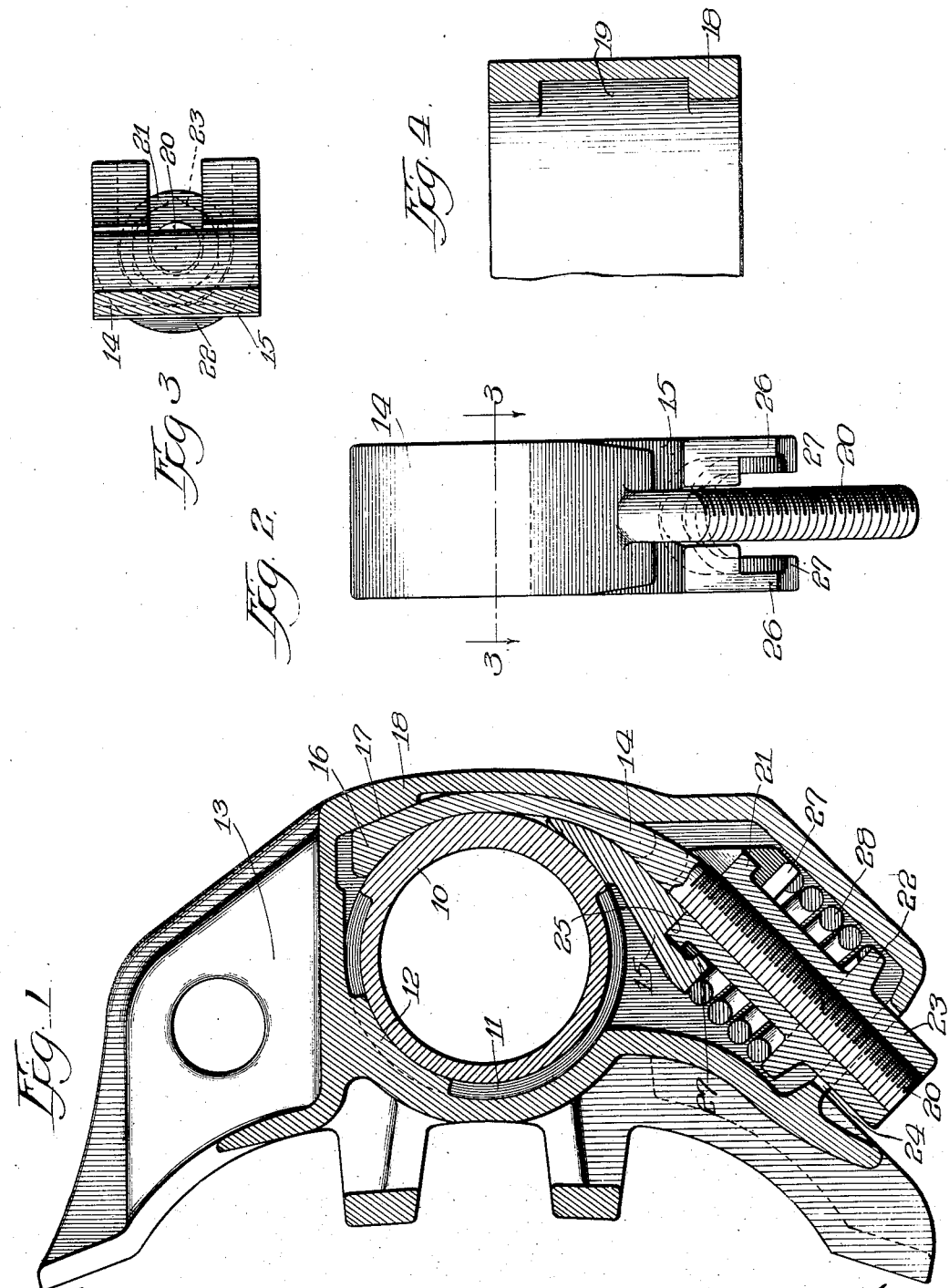

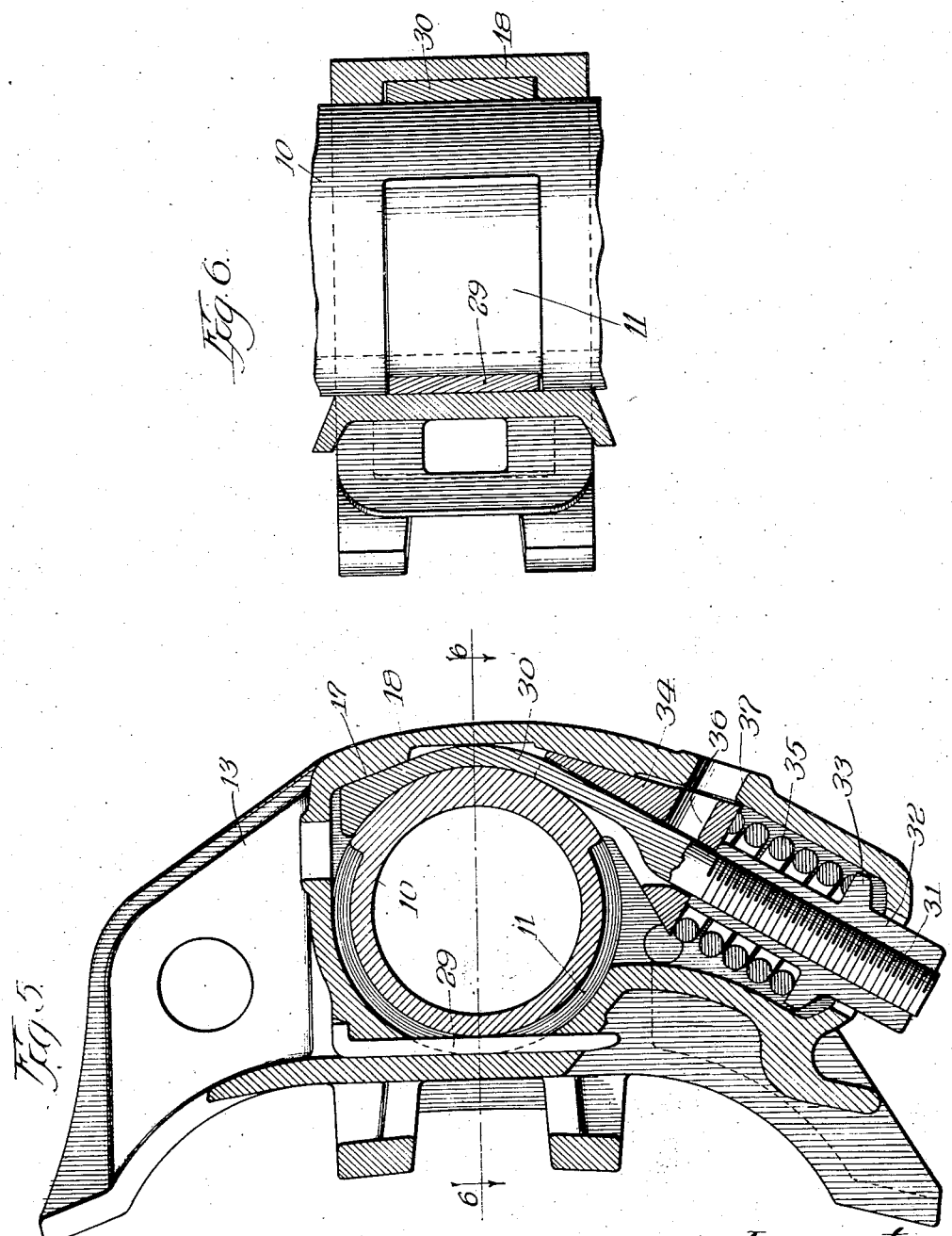

ARMAND H. PEYCKE, OF CHICAGO, ILLINOIS, ASSIGNOR TO AMERICAN STEEL FOUNDRIES, OF NEW YORK, N. Y., A CORPORATION OF NEW JERSEY.

ADJUSTABLE BRAKE-HEAD.

1,140,057. Specification of Letters Patent. Patented May 18, 1915.

Application filed November 28, 1914. Serial No. 874,522.

*To all whom it may concern:*

Be it known that I, ARMAND H. PEYCKE, a citizen of the United States, and resident of Chicago, in the county of Cook and State of Illinois, have invented certain new and useful Improvements in Adjustable Brake-Heads.

My invention relates to railway brakes and has particular reference to a novel brake head provided with means for adjustment on a brake beam.

In the use of railway car brakes it is customary to employ on beams for use in certain classes of service, a brake head which may be angularly adjusted and maintained. An object in the present device is to provide a head, the locking element of which may direct its force in a line substantially parallel to the force exerted in applying the brakes to the wheels. This has been found to be essential for the reason that notwithstanding the greatest care in the fitting of the brake head upon the sleeve or supporting bearing, there is found to be a certain degree of clearance or play, and unless the locking force is applied in a direction parallel with the direction of force in braking, there is a tendency to direct a portion of the braking force on to the locking device, with the result that the locking engagement is soon broken and the head is not held in adjusted position. Furthermore, it has been found that a rigid locking device, even though positioned with care and set as tightly as is possible, will become loose after a short period, a conclusion following such results being that the locking force should be spring-actuated or at least held against a spring resistance.

An object of my invention is, therefore, to provide an adjustable brake head, the locking means for which shall be spring-advanced and the locking force applied in a direction parallel to the direction of the force applied in braking.

The invention will be more readily understood by reference to the accompanying drawings, wherein, Figure 1 is a vertical section through a brake head constructed in accordance with my invention; Fig. 2 is a side elevation of the locking members; Fig. 3 is a section on the line 3—3 of Fig. 2; Fig. 4 is a fragmentary section through the back wall of the brake head; Fig. 5 is a view similar to Fig. 1, showing a slightly modified construction, and, Fig. 6 is a transverse section on the line 6—6 of Fig. 5.

Referring more particularly to the drawings it will be understood that brake heads such as shown herein are adapted to be applied to the ends of a brake or bar beam. On the ends of the beam are provided sleeves or bearings 10, these bearings, in the construction shown in Fig. 1, being provided with an incomplete peripheral groove 11, within which a lug 12, integral with the brake head 13, is fitted. The brake head is held on the bearing by this means. This attaching means is the well known bayonet joint and need not be further described.

Mounted in a recess in the lower portion of the head are the locking elements, which consist in a pair of opposed wedge members 14, 15, the former projecting past the axis of the head and having an enlarged upper end 16, one face 17, of which is a plane and bears against the similarly shaped surface on the rear wall 18, of the head. A downward pull on the member 14, tends to wedge the enlargement 16, between the head and the sleeve. In order to avoid unnecessarily weakening the back wall of the head the said wall is recessed, as at 19 in Fig. 4, the width of the groove corresponding to the width of the wedge members 14, 15, which width is less than that of the head itself. The lower portion of the wedge member 14, terminates in a threaded rod or stem 20, on which is located an internally threaded sleeve. This sleeve is provided with annular flanges 21, 22, and with a squared head 23, projecting through an opening 24, in the lower wall of the brake head. This squared head is so arranged as to be fitted by a wrench. The flange 21, is adapted to directly contact a shoulder 25, formed on the wedge member 15, and tends to move said wedge member in a direction opposite to that of the member 14. The wedge member 15, is, as best shown in Fig. 2, arranged in the form of a yoke, the two legs 26, of which straddle the sleeve and flange 21, an inturned flange 27, on the wedge member 15, contacting the flange 21, on a return movement thereof but providing a limited amount of clearance therebetween. The return movement stops when the sleeve flange 22, bears against the lower wall of the brake head in which position the wedges 14, 15 are released from the sleeve. It will therefore follow that under no condition can the locking elements be lost while in service and same cannot be removed until the brake head is removed from the sleeve. Between the lower end of the wedge member 15, and the flange 22, I mount a helical spring 28, this spring tending to advance the wedge member 15, and retract the member 14. However, this spring does not normally come into play, the parts being rigidly wedged in position by contact of the upper end of the sleeve with the surface 25, of the wedge member 15. In case the parts become loosened the spring then comes into action and maintains them tightly in engagement.

By means of the construction here described, the wedge members are, at one and the same time, rigidly and resiliently held in engagement; furthermore, the component of the forces exerted by the wedge members is a line which is parallel to and substantially coincident with the line of the force exerted in braking.

In the modified form shown in Figs. 5 and 6, the head is held in position on the sleeve 10, by means of a key 29. The locking members are constructed on the same principle as those heretofore described, but are arranged somewhat differently. The wedge member 30, occupies a position similar to that heretofore described, and has a threaded lower end 31, which passes loosely through an aperture in an opposed wedge member 34, and is engaged by a sleeve nut 32, having an annular flange 33, thereon. The square end of the sleeve nut 32, projects through an opening in the lower wall of the brake head. Also extending between the flange 33, and the wedge member 34, is a helical spring 35. When the parts are assembled and before the head is applied to the sleeve 10, the spring 35, will tend to hold the wedge member 34, in an advanced position relative to that shown in Fig. 5, and means must be provided for retracting the wedge member 34 before the head can be placed on the sleeve 10. To accomplish this I provide registering openings 36, 37, in the wedge member 34, and the head respectively, within which a bar or lever may be inserted and the member 34, forced downwardly into the position shown in Fig. 5. After the head is located on the sleeve the squared lower end of the sleeve nut 32, may be engaged by a wrench and the two wedges forced solidly against the sleeve. In case wear takes place and the positive engagement be broken, the spring will compensate for the wear and maintain the parts in proper relation. Because of the angle of the wedges and the nature of the force applied, the head may be kept tight with a minimum spring pressure.

The specific arrangement in both forms shown leaves the horizontal dimension of the head within the permissible limits, it being understood that the distance between the face of the shoe and the rear portion of the head is limited.

It is obvious that the constructions shown are typical only and may be modified in many particulars without departure from the spirit of my invention.

I claim:

1. In a device of the class described, the combination of a sleeve, a head, a pair of wedges, means for positively forcing said wedges against said sleeve, and additional means for compensating for wear in the parts and for maintaining said wedges tightly against said sleeve, substantially as described.

2. In a device of the class described, the combination of a sleeve, a head, a pair of oppositely disposed wedges mounted to act against said sleeve above and below the rotative axis of the head, means for positively forcing said wedges against said sleeve, and an elastic take-up element for compensating for wear, substantially as described.

3. In a device of the class described, the combination of a bearing, a rotatable head mounted on said bearing, wedge means exerting force substantially in line with the line of force exerted in braking, positive means for advancing said wedge, and elastic means acting on said wedge means and adapted to maintain said wedge means in engagement with said bearing when the efficiency of said positive means is reduced, substantially as described.

4. In a device of the class described, the combination of a bearing, a rotatable head mounted on said bearing, wedge means exerting force substantially in line with the line of force exerted in braking, positive means for advancing said wedge, and compensating means mounted for action in conjunction with and as an adjunct to said positive means, substantially as described.

5. In a device of the class described, the combination of a bearing, a rotatable head mounted on said bearing, wedge means acting upon said bearing and said head, the resultant of the force exerted by the wedge means being a substantially horizontal line, and combined means for positively advancing and elastically maintaining said wedge means in engagement with said bearing, substantially as described.

6. In a device of the class described, the combination of a bearing, a rotatable head mounted on said bearing, wedge means acting upon said bearing and said head, the resultant of the force exerted by the wedge means being a substantially horizontal line, positive means for forcing one wedge element in an upward direction and another wedge element in a downward direction, and non-positive means for continuing such action, substantially as described.

7. In a brake, the combination of a beam having a bearing, a head mounted on said bearing, a pair of wedges mounted in the back of the head and acting on said sleeve, one above and the other below, a horizontal line extending from the rotative axis of the head, the resultant of the forces applied by said wedges being a substantially horizontal line, screw means for positively forcing said wedges into holding engagement, and spring means for maintaining such engagement, substantially as described.

8. In a brake head, the combination of a pair of wedges mounted in opposed relation and each exerting its force toward the axis of said head, screw means acting to force said wedges into operative position and to positively retract the same therefrom, and spring means likewise tending to force said wedges into operative engagement, substantially as described.

9. In a device of the class described, the combination of a sleeve, a rotatable head, a pair of wedges mounted in said head to the rear of said sleeve, each of said wedges acting to exert force on said sleeve above and below a horizontal line passing through the rotative axis of the head, one of said wedges being screw-threaded, a nut on said screw-threaded portion, said nut being adapted to engage the other wedge and positively force said wedges against said sleeve, and a spring engaging said nut and one wedge member and tending to compensate for wear and maintain said wedges in holding engagement, substantially as described.

10. In a device of the class described, the combination of a head having a recess, head locking devices including a spring and a tightening nut located in said recess, all said locking devices being unseatable or removable only after removal of the head from its bearing, said nut having a portion projecting outside of said head, substantially as described.

ARMAND H. PEYCKE.

Witnesses:
    CHAS. F. MADDOX,
    T. D. BUTLER.